Patented Mar. 5, 1929.

1,704,451

UNITED STATES PATENT OFFICE.

OTHMAR WINDBERGER, OF WIENER-NEUSTADT, AUSTRIA.

MOTOR VEHICLE WITH TUBULAR UNDERFRAME.

Application filed December 29, 1927, Serial No. 243,410, and in Austria May 29, 1926.

The invention relates to a motor vehicle with a tubular supporting member in place of the usual underframe. The invention consists in the frame-tube extending beyond the wheel axle, that is to say, the frame-tube being lengthened beyond the wheel-axle.

The invention further, consists in the part of the tube protruding beyond the wheel-axle being formed as a bearer for the fuel-tank, for the fitting of luggage-carriers or spare-wheel supports or other equipments of the car.

Such a frame in the form of a continuous tube extending from end to end offers great advantages. It can be easily be placed in such a way, that its axis is lying lower down than the centres of the wheels. This renders possible to locate the car-body lower down than hitherto possible—and that without the frame-tube projecting into the interior of the car-body.

When employing swing-axles the frame in the form of a tube extending beyond the wheel-axle has the advantage that the halves of the axles can be supported directly upon the tube and that in such a manner that the swing-axis coincides with the axis of the tube.

For driven axles such a continuous tubular frame enables a drive in the usual manner even then when its axis is placed lower down than the centres of the wheels and that simply by placing the driving-shaft on a level with the wheel-axles, thus eccentrically in relation to the axis of the tube.

Figure 1:
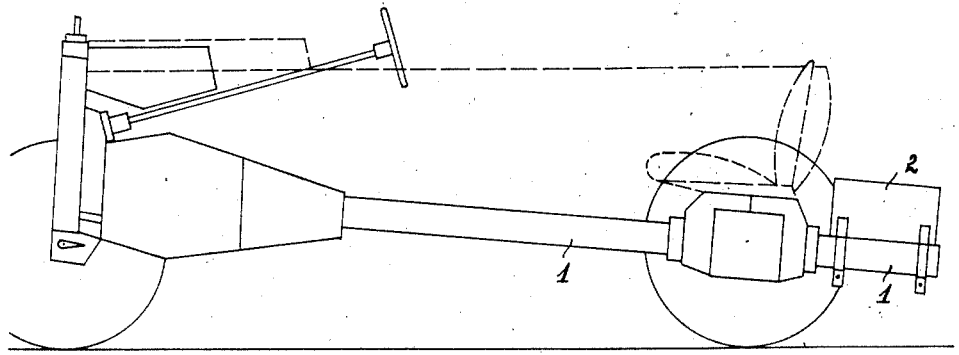
Fig. 1 is a diagrammatic longitudinal section of a motor vehicle illustrating the invention applied thereto.

Referring to the drawing in detail the single twist-resisting straight tubular supporting member 1 located at the axis of the motor vehicle and being of substantially uniform diameter throughout its length is extended beyond the rear axle to provide a support for the gas tank 2 or any other part of the equipment of a motor vehicle which it is desired to support thereon.

Figure 2:
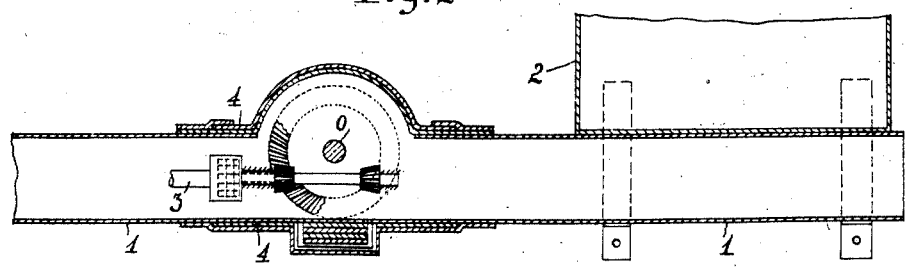
Fig. 2 is an enlarged detail of a modification of the invention.

According to the arrangement illustrated in Fig. 2 the two halves of the rear axle 4 are mounted for swinging movement directly on the tubular member 1 and receive the usual rear axles 0. The drive shaft extending rearwardly from the vehicle motor is connected with the axles 0 by a preferred type of gearing.

Figure 3:
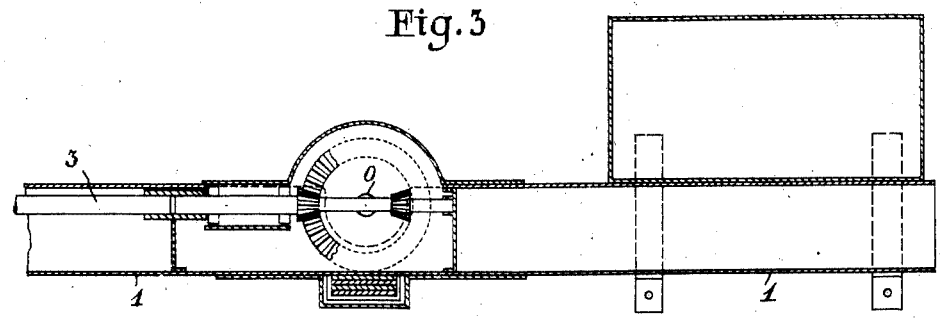
Fig. 3 is an enlarged detail of a further modification.

According to the modification illustrated in Fig. 3 the tubular member 1 is so disposed that its axis lies below the axis of the drive shaft 3, but in other respects the arrangement is substantially the same as that described in connection with Fig. 2.

What I claim is:

1. Motor vehicle chassis characterized in that it consists of a single twist-resisting straight tubular supporting member extending in the medial plane of the vehicle and of uniform size beyond the vehicle wheel axle.

2. Motor vehicle chassis as claimed in claim 1 characterized in that the part of the tubular frame protruding beyond the wheel axle is constructed as a support for the equipments of the car.

3. Motor vehicle chassis as claimed in claim 1 characterized in that the axis of the tubular frame is located lower down than the centres of the wheels.

4. Motor vehicle chassis as claimed in claim 1 with swing axles, characterized in that the axis of oscillation of the swing axles coincides with the axis of the frame tube.

5. Motor vehicle chassis as claimed in claim 1 with swing axles, characterized in that the axis of the frame-tube is located lower down than the centres of the wheels and the swing axis coincides with the tube axis.

6. Motor vehicle chassis as claimed in claim 1 with driven axles, characterized in that the tube-axis is placed lower down than the centres of the wheels and the driving shaft is supported in the tube eccentrically in relation to the tube axis at a level with the wheel axles.

7. Motor vehicle chassis as claimed in claim 1 with the vehicle axle on the frame-tube being constructed as a driven swing axle, characterized in that the axis of oscillation of the swing axles and the axis of the wheel centres are located at different levels and that a driving mechanism is provided in which the driving shaft and the wheel axles are connected by means of a transmission gear permitting an oscillatory movement of the wheel axles.

8. Motor vehicle chassis as claimed in claim 1 with the frame tube being placed lower down than the wheel axles, characterized in that the driving shaft is eccentrically supported in the frame tube in such a way that—notwithstanding the low supporting of the car body on the chassis—a normal driving can be employed.

9. Motor vehicle chassis as claimed in claim 1 characterized in that the driving mechanism is arranged in a casing which is mounted like a saddle above a slot in the frame tube.

10. Motor vehicle chassis as claimed in claim 1 characterized in that the casing containing the driving mechanism is secured to the frame-tube by means which, at the same time, secure the bracket for the axle springs to said tube.

In witness whereof I have hereunto signed my name.

OTHMAR WINDBERGER.